Nov. 8, 1960   F. G. SAURMA   2,959,376
ROCOPTER AND LANDING CONTROL METHOD
Filed Dec. 1, 1958   5 Sheets-Sheet 1

Friedrich G. Saurma,
INVENTOR.

BY S. J. Rotondi,
A. T. Dupont,
V. L. Billings, and
Alvin E. Moore,
ATTORNEYS.

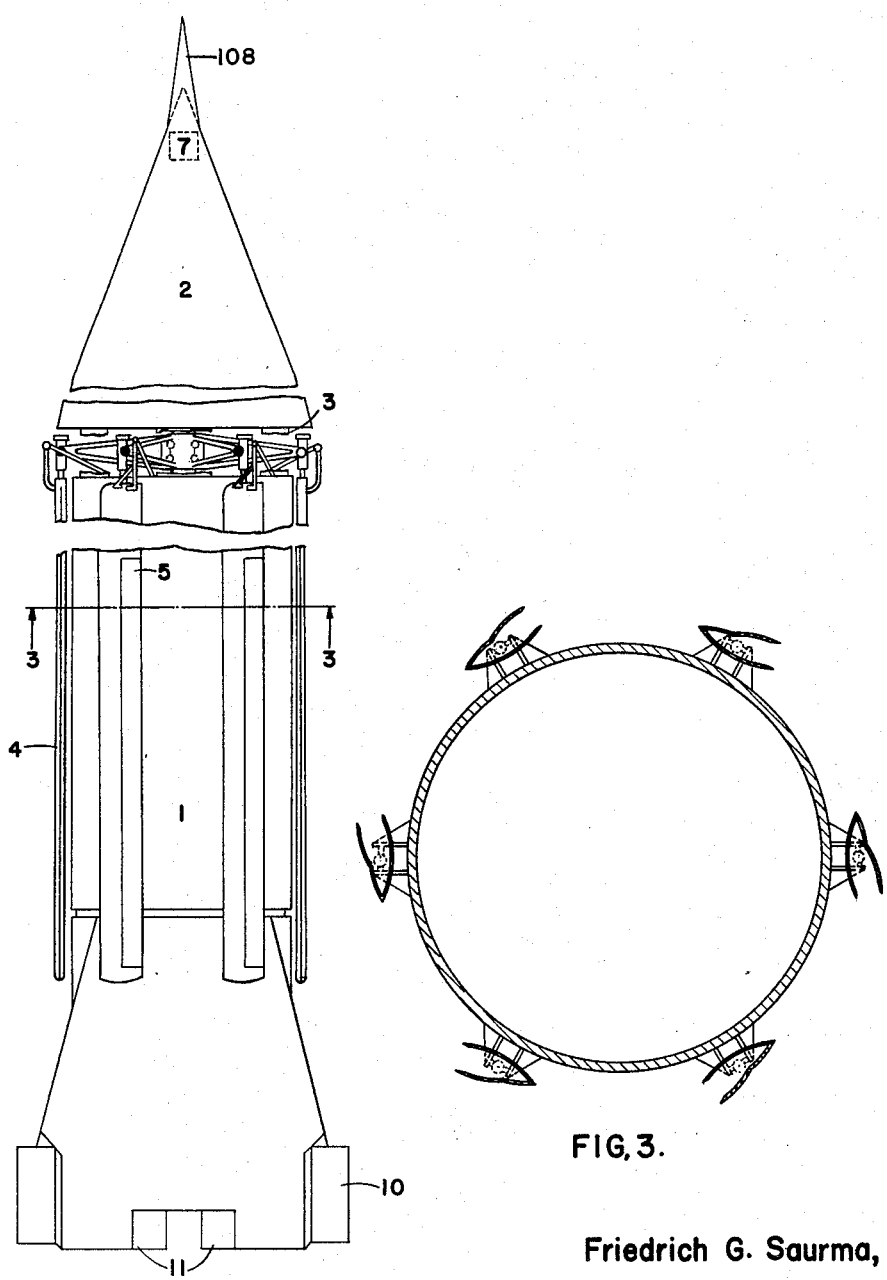

Nov. 8, 1960   F. G. SAURMA   2,959,376
ROCOPTER AND LANDING CONTROL METHOD
Filed Dec. 1, 1958   5 Sheets-Sheet 4

Friedrich G. Saurma,
INVENTOR.
S. J. Rotondi,
BY A. T. Dupont,
V. L. Billings, and
Alvin E. Moore,
ATTORNEYS.

Nov. 8, 1960
F. G. SAURMA
2,959,376
ROCOPTER AND LANDING CONTROL METHOD
Filed Dec. 1, 1958
5 Sheets-Sheet 5
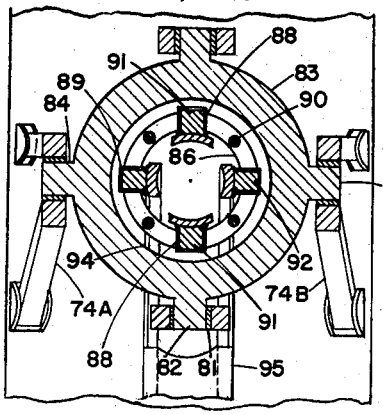
FIG. 8
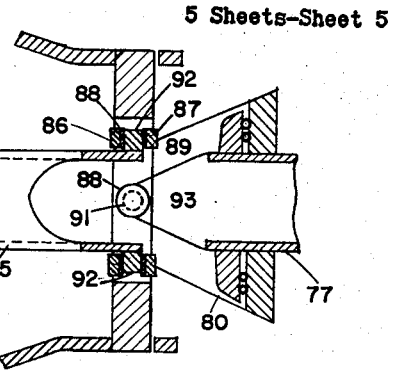
FIG. 9.
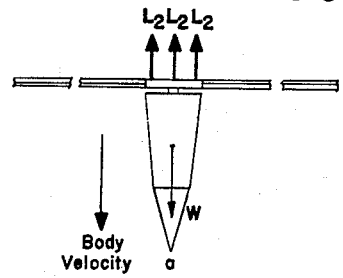
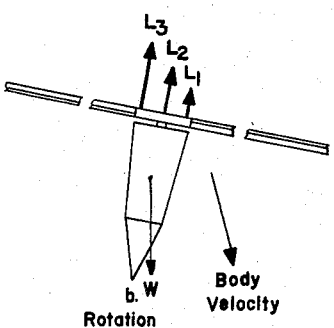
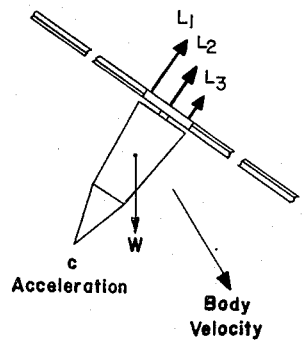
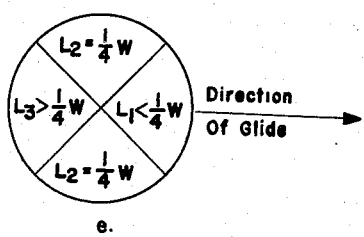
FIGURE 10
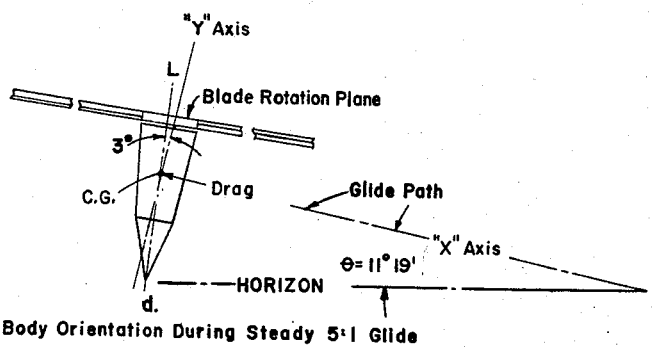
Friedrich G. Saurma,
INVENTOR.
BY S. J. Rotondi,
A. T. Dupont,
V. L. Billings, and
Alvin E. Moore,
ATTORNEYS.

United States Patent Office 2,959,376
Patented Nov. 8, 1960

2,959,376

ROCOPTER AND LANDING CONTROL METHOD

Friedrich G. Saurma, 3309 Panorama Drive SE., Huntsville, Ala.

Filed Dec. 1, 1958, Ser. No. 777,529

12 Claims. (Cl. 244—14)

(Granted under Title 35, U.S. Code (1952), sec. 266)

The invention described herein may be manufactured and used by or for the Government for governmental purposes without the payment of any royalty thereon.

This invention relates to a rocopter and landing control method. The rocopter combines features of a space rocket and of a rotary-winged space-and-air traversing cargo compartment. The landing control method comprises steps by which a rocopter is decelerated and guided into a predetermined landing area.

An important step in the development of the space vehicle is the provision of a practical means and method, in combination with the presently practical type of missile, for decelerating the separated payload of a cargo-carrying missile, and for safely and accurately guiding and controlling the cargo-carrying part of the re-entered missile to a desired landing place. In the armed services, and especially in the Army, such a safely re-entered and accurately guided cargo carrier is of prime importance. By means of it, for example, troops that have become isolated in an area, due to atomic attack or other enemy action, could be supplied and/or reinforced. Another instance of the military use of such a rocopter would be in the supply and/or reinforcement of an army or scientific unit that has become isolated in the Arctic or Antarctic zone by storm or conditions of bad visibility.

An example of the civilian use of this space vehicle and method is in the very fast transport of mail, freight or passengers over long distances.

In view of these facts, one of the objects of this invention is to provide a space missile or rocopter having: An after, fuel carrying booster portion of relatively inexpensive components, that may be discarded by separation; a forward, instrument-and-cargo carrying portion or space cabin that has an autogyro rotor; mechanism for partially unfolding the rotor prior to its re-entry into the stratosphere; and means for remote control of the rate of deceleration, the gliding angle and the direction of flight of the space cabin while it safely descends thru the atmosphere.

Another object of the invention is to provide an air-rotated assembly, adapted for use on a space-traversing missile or other vehicle during its re-entry into the atmosphere, comprising rotor blades having pitch-changing means by which the vehicle's rate of deceleration may be controlled and having rotor-braking means by which the rotor's revolutions per minute may be limited to a safe speed.

A further object is to provide a method of controlling the re-entry and landing of a space vehicle that has a wind-actuated, vehicle-decelerating rotor, whereby the vehicle's large spatial velocity is reduced in the stratosphere to a safe level, and thereafter the vehicle is guided and controlled from the ground into a predetermined landing place.

The foregoing and other objects of the invention will become more fully apparent from the following detailed description of exemplary structure embodying the invention and from the accompanying drawings, in which:

Figure 2 is a plan view, partly broken away, of the complete vehicle, assembled and ready for launching.

Figure 3 is a sectional view of the vehicle, taken from the plane 3—3 of Figure 2, with the hinged braking flaps shown as partially opened.

Figure 8 is a detailed sectional view taken from the plane 8—8 of Figure 6, shown on an enlarged scale.

Figure 9 is a detailed sectional view taken from the plane 9—9 of Figure 6, shown on an enlarged scale.

Figure 10 is a diagrammatic showing of the various positions and quarterly lifting forces of the air-turned rotor in the rocopter's transition from its deceleration phase to its gliding phase.

Figure 4:
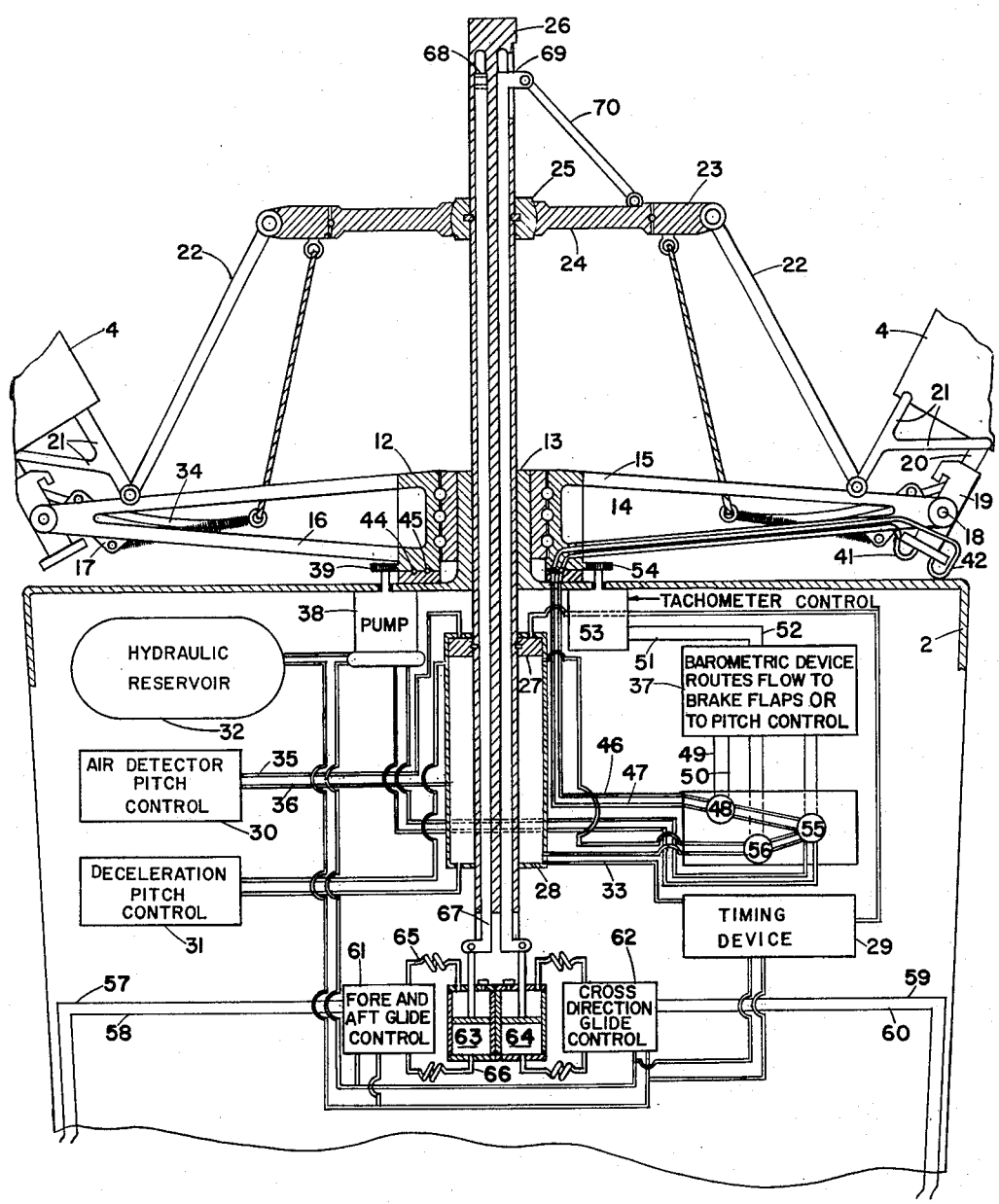
Figure 4 is a semi-schematic view, partly in section, of the cargo cabin or payload portion of one form of the vehicle, indicating parts of the wind-rotated blades as being broken-away near their roots, and showing the cabin as having made most of its flight thru space and, just prior to re-entry into the atmosphere, as having its rotor blades moved into partially open position.
Figure 7:
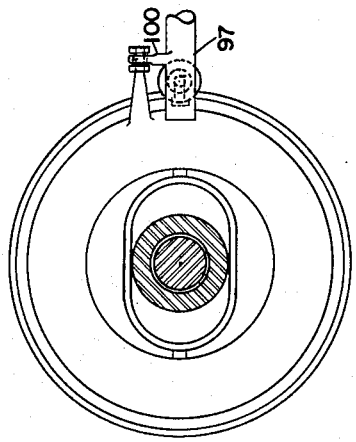
Figure 7 is a sectional view, taken from the plane 7—7 of Figure 6, but shown on a reduced scale.
Figure 6:
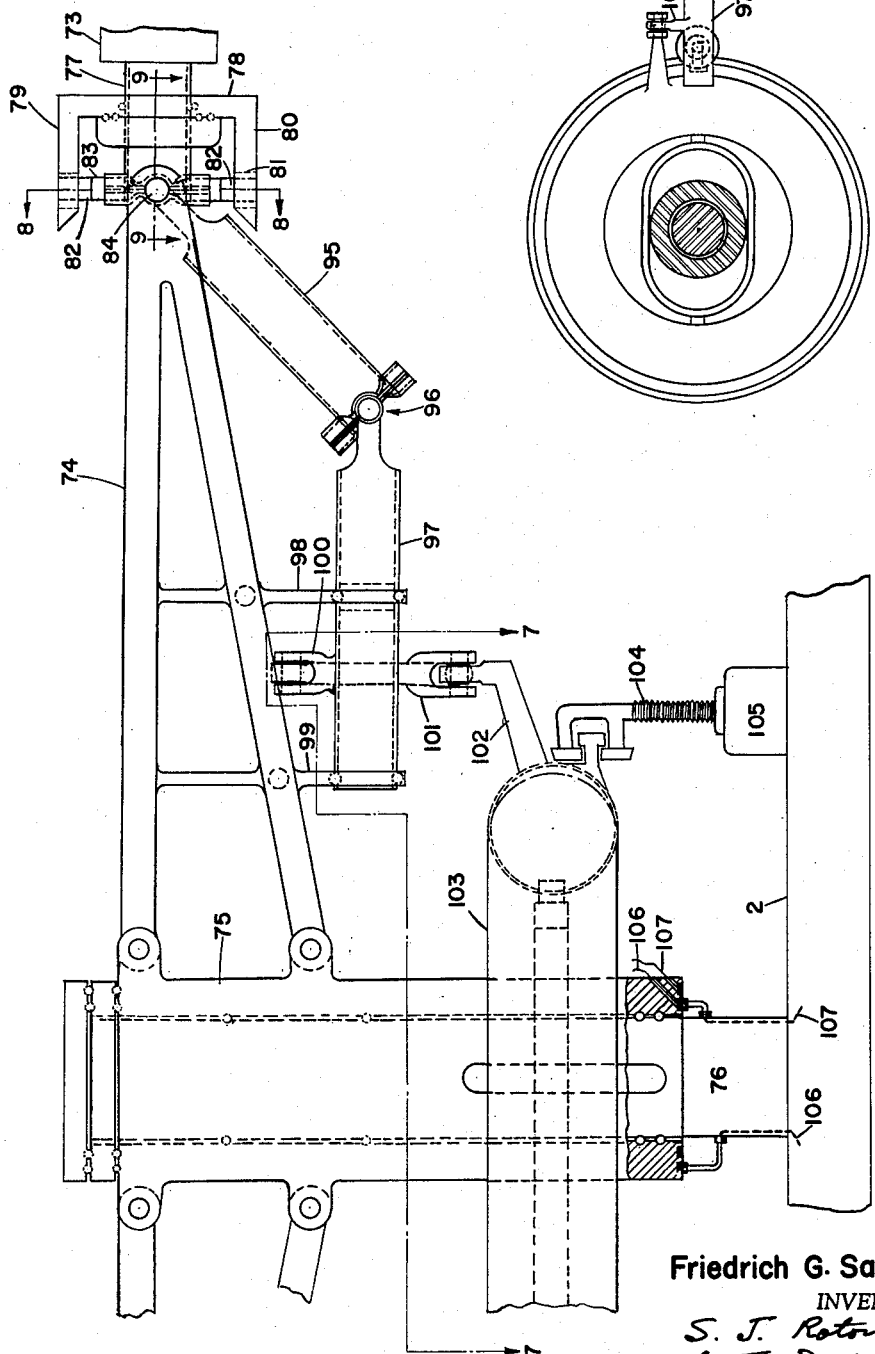
Figure 6 is a semi-schematic view, partly in section, of another form of wind-turned rotor.

With reference to the drawings, the rocopter or space vehicle of the invention, broadly shown in Figure 2, comprises: A rear, booster or propulsive portion 1; a forward, payload-carrying frame or cabin 2 for transporting cargo and/or passengers, fixed to booster 1 by means of frangible struts or bolts 3, of a type that is known in the missile art, which are broken during the missile's flight by the explosion of cartridges in response to action of a timing or other automatically functioning device; a wind-rotatable wheel or rotor, comprising hinged blades 4, for decelerating the cargo cabin in the upper levels of the atmosphere and safely landing it; pitch-controlling mechanism for changing the pitch of the blades (alternative forms of which are shown in Figures 4 and 6), controllable brake flaps 5 for braking the speed of rotation of the rotor; and means for cyclically and directionally varying the pitch of each blade during each rotation. Each of the blades or airfoils 4 is of a length that is greater than the length of the cabin, and, when folded to a position parallel to the longitudinal axis of the booster portion, extends aft, parallel to the longitudinal axis of the composite craft, nearly the entire length of the cylindrical portion of the booster. During launching, the booster shell thus prevents injury to the airfoils, while allowing the autogyro rotor to be of the large diameter that is necessary for braking the re-entry descent of a substantial payload. The structure of the invention further comprises a radar or radio receiver and electrical control unit 7, of a type that is known in the missile art, which receives a radar or radio beam 8 (Figure 1) and accordingly controls the cyclical points of maximum and minimum pitch, and thus the direction in azimuth of the cargo cabin's glide path, and also comprises a radar device 9 in the landing area, by means of which the landing cargo cabin may be tracked and radio command signals may be sent to receiver unit 7.

The separable booster part 1 of the composite vehicle has a rocket motor portion and, optionally, may have exterior guide vanes 10 and/or carbon guide vanes 11 that are in the path of the propulsive gas stream.

Figure 1:
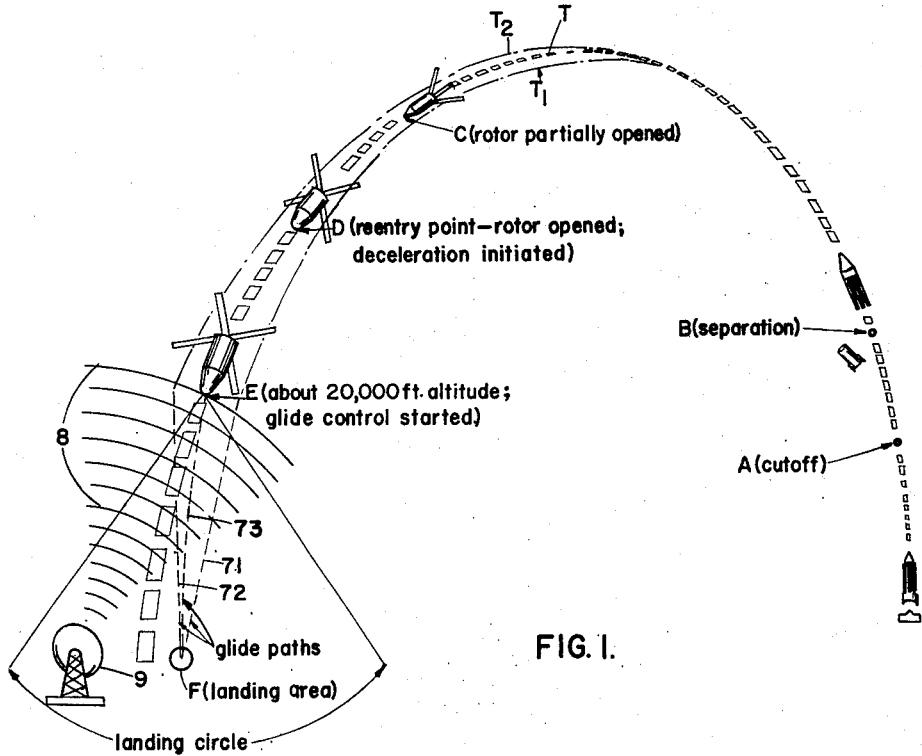
Figure 1 is a schematic view indicating the structure and method of the invention from the point of view of the missile's complete flight.

As indicated in Figure 1, when the composite vehicle or rocopter reaches the point A the fuel, if it be liquid, is cut off, or, if it be solid propellant, is diverted to a side of the booster nozzle so that the missile no longer is fuel-propelled. At point B of the rocopter's trajectory the struts or bolts 3 are broken or cast off by timed explosions of cartridges, the booster 1 is discarded, and the cargo cabin 2 continues to follow a spatial trajectory until it curves downward and nears the stratosphere at point C, when the blades of the wind-rotatable wheel are partially opened by a time-controlled mechanism.

The form of the wind-turned rotor that is shown in Figure 4 comprises a hub 12, having radial and thrust bearings on cylindrical projection 13 (that is fixed to cabin 2), a spoke assembly, and a plurality of wind-rotated blades 4.

The spoke assembly has a plurality of bifurcated frames 14 each of which has legs 15 and 16. The assembly comprises, for each blade 4, a pair of such frames arranged in A-formation with its apex adjacent the root of a blade, the pair being rigidly held together by means of hub 12, an integral cross bar, to which spring-holding bracket 17 is fixed, and bearing support rod 18 on which the bearing sleeve 19 for the root of the blade is pivoted.

Although two blades 4 are shown in Figure 4, any efficiently operating number of such blades may be utilized. Each blade not only may pivot on rod 18, for variation of its dihedral angle during flight, but also may turn for pitch angle change by means of radial and thrust bearings between root 20 and bearing sleeve 19.

This change of pitch is effected by hydraulic pitch control mechanism, which includes rods 21 that are fixed to the blades and connecting links 22 that are pivoted to rods 21 and to rotary collar 23. Collar 23 has a radial and thrust bearing on disk 24 (which, optionally, may be spoked), and this disk is connected by a ball-and-socket joint 25 to rod or shaft 26, which may be reciprocated in projection 13 by means of the hydraulic pitch-changing motor.

The pitch-controlling hydraulic motor assembly comprises piston 27, which is keyed to shaft 26, and is reciprocable in cylinder 28 by hydraulic fluid that may be controlled in succession by three automatic control devices, the first-functioning one of these devices being the timing device 29, the second being the air detector control means 30, and the third being the deceleration control means 31.

In the position of the cargo cabin that is shown in Figure 4, the deceleration control is not functioning because the rocopter has not yet entered the atmosphere and in consequence the accelerometer (or decelerometer) that is a part of device 31, and that may be any known type of such instrument, is not being influenced sufficiently to move its attached four-way valve into position to supply fluid thru the valve to fluid motor cylinder 28. Also, since in this phase of the flight the cabin has not re-entered even the very rarefied air of the stratosphere, the air-detecting barometer that is part of control device 30 has not been influenced to move its attached four-way valve into position to supply fluid to the fluid motor.

However, piston 27 of the motor has been actuated by pressurized fluid coming from hydraulic reservoir 32 via the four-way valve in timing device 29. As shown in Figure 4, the piston 27 has been moved to its outer position by fluid from line 33, thus releasing the spring-loaded latches 34, and forcing the blade ends of the pivoted latches against a flatted portion of bearing sleeve 19, thereby pivoting the blades on 18 into a partially opened position. At the same time the outward movement of elements 24 and 23 has actuated rods 22, thus setting the pitch angles of the blades into the fully feathered position of approximately or nearly ninety degrees. In this position, and when the cabin enters the upper stratosphere (above point D), the blades function like the feathers of an arrow and tend to stabilize the craft's flight, keeping the rotor to the stern of the cabin.

After the rocopter has moved a short distance thru the upper stratosphere to point D, the small amount of air present actuates air detector 30. This element comprises a two-way valve and a barometer, of known type, said barometer holding the valve closed when the air pressure is at or near zero, then opening the valve, when the air pressure rises a predetermined amount, to send a flow of motive fluid to and from the reservoir 31 and cylinder 28, quickly thereafter again closing the valve, when the pressure rises above that of the top part of the stratosphere. During this brief supply of motive fluid to cylinder 28, the pressurized fluid is transmitted from detector means 30 via conduit 35 to the outer end of the cylinder, and exhaust fluid from the motor flows to the detector valve via conduit 36. Thus piston 27 is moved back to about its middle position, changing the pitch angles of the blades from fully feathered to a lifting position.

Deceleration phase of rocopter's flight

The relative wind of descent thru the stratosphere then begins to turn the blades, which are opened into a flat-conical path by centrifugal force on them, and the rocopter begins to decelerate. At this point two other controls begin to function: the deceleration, pitch control, 31, and the system for braking the rotary speed of the blades to a safe maximum which comprises barometric device 37.

The rate of deceleration of the space cabin is controlled by changing the pitch of the wind-turned rotor blades until their lift is substantially equal to the desired decelerating force. The same pitch-changing fluid motor, 27—28, is used in this sequence as in the preceding pitch-controlling operations. But the fluid pressure that is now utilized no longer is supplied entirely from the hydraulic reservoir but, at least in part, is now produced by pump 38. This pump, of a known type, is driven by spur gear 39 and a ring gear on hub 12, which hub is now rotating.

Deceleration control means 29 comprises an accelerometer that is sensitive to accelerations along the line of flight, which in the stratosphere and until the gliding phase of the descent is reached, is along the axis of the rotor. In known manner, the accelerometer actuates, either directly or via known electrical connecting means, a four-way valve which routes motive fluid to the pitch-increasing end of cylinder 28 when the rate of deceleration (negative acceleration) is below the desired rate, and to the pitch-decreasing end of the cylinder when deceleration is above the desired rate.

Since the desired rate of deceleration during the descent of the cabin, part of which is at supersonic speed, ordinarily would involve a dangerous speed of rotation of the blades, a system is provided to limit this speed to a safe maximum, at which the centrifugal force on the blades will not be great enough to damage the rotor or its bearings. This system comprises: a hinged brake flap 5 near the tip of each blade; a fluid servomotor cylinder 39 and piston 40 (Figure 5), connected to each flap by linkage 41; a pair of flexible fluid conduits 42 and 43 leading from a pair of slip rings 44 and 45; a pair of conduits 46 and 47 that are flow-connected to slip rings 44 and 45 and to four-way valve 48; electrical conductors 49 and 50 leading to valve 48 from a switch in barometric device 37, which switch is closed during the deceleration phase of the craft's descent; electrical conductors 51 and 52 leading to said closed switch from make-and-break contacts in tachometer control device 53; and a tachometer in said tachometer control device that is driven by spur gear 54, that is in mesh with the ring gear on hub 12.

Barometric device 37 comprises a barometer and two make-and-break devices, of known types, one of said devices routing current to and from a solenoid that moves four-way valve 55 to open it to flow to and from valve 48 while the air pressure is below a predetermined amount (during the deceleration phase of the rocopter's descent), and the other of said devices routing current to and from a second solenoid that moves valve 55 to open it to flow to and from valve 56 while the air pressure is above a predetermined amount (during the gliding phase of the descent).

Figure 5:
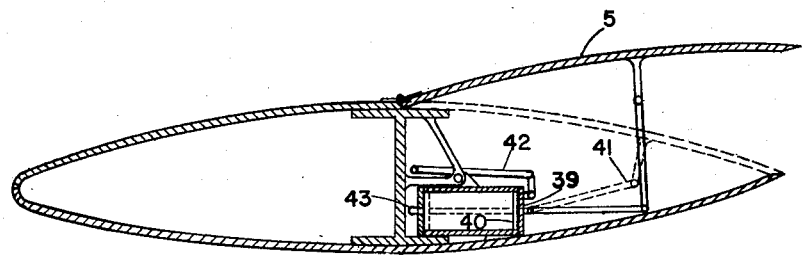
Figure 5 is a detailed, sectional view of one of the blades, taken from a plane extending transversely thru a preferred form of blade, showing one of the brake flaps in hydraulically opened position.

The tachometer device 53 comprises a tachometer and two make-and-break devices of known types, comprising switches actuated by the tachometer for controlling circuits to valves 48 and 56. When, during the deceleration phase of the rocopter's descent, the speed of the rotor exceeds a predetermined amount, which for example may be 200 r.p.m., the tachometer actuates one of said make-and-break devices to close its switch and route current, that enters the tachometer control device from a battery or other electrical source, to and from four-way valve 48, solenoid-controlling the valve to route fluid from the pump and reservoir to move each brake-flap motor piston 40 toward its extreme position as shown in Figure 5, thus opening the brake flaps 5 an amount depending on the extent that the rotor has exceeded its desired maximum speed. On the other hand, when the rotor's speed is below the desired range (for example, 190 r.p.m.), the tachometer actuates a second make-and-break device, thus solenoid-controlling valve 48 to route pressurized fluid to move each piston 40 toward the left as shown in Figure 5, thus decreasing the degree of opening of flaps 5, and preferably closing the flaps at an optimum speed, which for example, could be 150 r.p.m. Thus, during the deceleration phase, the rotor may be held to a safe rotary speed by means of controlled brake flaps or spoilers. However, when the blades are made of material especially resistant to heat, such as any of the heat-resistant alloys of steel the brake and their control means may be eliminated, together with their function.

In any event, when the blades enter the stratosphere, both before and after they begin to be rotated by the relative wind, they have a resultant air speed that is supersonic, during much of the deceleration phase, due to the supersonic speed of the rocopter in space. Therefore, the wind-turned airfoils of the rotor are of supersonic or near-supersonic configuration. Any known supersonic airfoil shape may be utilized, such as that of Fig. 3, which (when the brake flaps are closed or eliminated) includes sharp leading and trailing edges, and convex suction and pressure faces. However, for more efficient wind rotation, the form of airfoil shown in Fig. 5 (or a known variant thereof), comprising a convex pressure face, slightly flatted relative to a convex suction face, a rounded leading edge, and a sharp trailing edge, is preferred.

At point E (Fig. 1), within the top half of the troposphere (for example at about 20,000 feet), the deceleration phase of the descent is ended. At this point substantially all the kinetic energy of the rocopter in space has been dissipated in air movement and heat caused by the rotary blades, and in heat adjacent to and in the outer skin of the cabin. However, since the supersonic part of the craft's descent thru the atmosphere is in cool, rarefied air (of the stratosphere and the upper part of the troposphere), the heat of the skin of the cabin and vanes does not rise to the dangerous amounts that would be involved if the cabin were not provided with the decelerating rotor. Nevertheless, the skin of the cabin and blades preferably is made of a material that is adapted to resist the destructive effects of heat.

*Gliding phase of rocopter's descent*

The radio or radar beam 8 emanates from radio or radar device 9, which is located within a landing circle that preferably is about 40 miles in diameter. If this beam combines radar and radio-command features, it (or else the radar part of the guidance and control beams) is directed to the rocopter when the craft is at point D or at any position between points D and E, depending on the type and power of radar device 9. In any event, when the rocopter arrives at point E, radio receiver and electrical control unit 7 is receiving radio command signals from device 9 to guide the craft toward the specific landing area F.

In military use in the field it is preferable to control the glide path by means of a small, short-range radio command system, which would require low power and not be easily detected.

From device 7 control voltages are conducted via wires 57, 58, 59 and 60 (Figure 4) to glide-control devices 61 and 62.

By means of fluid motor 63 the gliding angle of the craft in a fore-and-aft direction is controlled. By means of motor 64 the gliding angle in a direction normal to the fore-and-aft axis of the cabin is controlled. By means of a combination of operations of motors 63 and 64 a glide angle in a selected direction and steepness of descent may be obtained.

If, for example, the rocopter arrives at a re-entry point via trajectory $T_1$ instead of planned trajectory T, from point D to point E the craft further departs downward from trajectory T due to the deceleration caused by the rotor. (For convenience of illustration, this decelerating departure from the trajectory between points D and E is not shown in Figure 1.) Accordingly, the operator on the ground would send a set of signals, which later will be described, that would provide a greater lift in the after quadrant of the rotor's rotation (as shown in sub-Figure 10e) than in the forward quadrant, thus tipping the rotor's disk and the cabin into a gliding angle ($\theta$), relative to the horizontal plane and accelerating the rocopter's forward speed, and that thereafter would bring the craft into a steady, long, low-pitched glide along path 71.

Conversely, if the rocopter arrives at a re-entry point via trajectory $T_2$, the operator in the landing circle sends a set of radio signals which culminate in bringing the craft into a steady glide that has a gliding angle $\theta$ that is steeper than in the preceding example, along path 72. Line 73 indicates the glide path that is planned for trajectory T, preferably involving a glide angle $\theta$ of about eleven degrees, as indicated in sub-Figure 10d.

The signal voltage, preferably amplified, that actuates the pitch control mechanism for guiding and maintaining the rocopter in the desired glide path is conducted from control device 7 via a circuit comprising conductors 57 and 58 to fore-and-aft glide control device 61 or, alternatively, to cross-direction glide control device 62 or, alternatively, to both of the path-controlling devices. Each of these control devices comprises a four-way valve that is movable by either of a pair of solenoids. Device 61 provides for a supply of pressurized fluid to fluid motor 63, and thus determines the difference between the cyclic lifting forces in the forward and after rotational quadrants (sub-Figure 10e), whereas device 62 similarly determines the difference between the lifts in the left and right rotational quadrants.

When, for example, a greater lift is needed in the after rotational quadrant than in the forward quadrant, the amplified signal voltage from receiver device 7 is supplied via the circuit comprising conductors 57 and 58 to fore-and-aft glide device 61. The voltage actuates one of the solenoids in device 61, and thus opens the four-way valve to send motive fluid via conduits 65 and 66 to and from motor 63, thus pushing connecting rod 67, as shown in Figure 4, away from the motor cylinder and cabin.

To the outer end of connecting rod 67 there is connected an element 68, which is similar to element 69; and to element 68 there is connected a pivoted link, that is similar to link 70 and extends, as shown in Figure 4, downward from the plane of the paper to universally mounted disk 24. By the above-described actuation of motor 63, rod 67 and pitch-changing levers 22 and 21, the pitch of the blades is cyclically changed during each rotation of the rotor, providing a smaller pitch angle and less lift in the forward rotational quadrant than in the after quadrant, thus tipping the rocopter's rotor into a larger glide angle $\theta$.

In a similar manner, motor 64 may be actuated to obtain gliding movement in a direction in azimuth that is across the re-entry trajectory; or both motors 63 and 64 may be actuated to cause a glide path along a line that makes any other desired gliding angle and path direction. Glide paths 71, 72, and 73 are three of the many possible paths along which, after its deceleration, the rocopter may be guided.

The craft's transition from its deceleration to its gliding phase is schematically shown in Figure 10. At the end of its deceleration (at point E of Figure 1), with its kinetic energy spent, the rocopter is momentarily traveling in a nearly or substantially vertical direction, at a subsonic velocity. At this point, the pitch angle of the blades is decreased to reduce the rotor's lift to approximately equal the weight of the craft. At about the same time a radio signal from the landing site begins to control the transition from substantially vertical motion to the glide attitude that is necessary to guide the rocopter to the landing site.

In the example of guidance and control that is indicated in Figure 10, the selective pitch control, under radar and/or radio guidance and control (as shown in sub-Figure 10b) decreases the angle of attack of the blades (and their consequent lifting force) as they pass the radial point nearest the landing site, and increases the angle of attack as they pass the diametrically opposite point. As indicated in sub-Figures b and e of Figure 10, this action results in a greater lift, $L_3$, in the after rotational quadrant than the lift, $L_1$, in the forward quadrant, and two equal lifts, $L_2$, equal to approximately one-fourth of the craft's weight, in the other two quadrants. The consequent resultant lift, which is unbalanced relative to the vertical, leads to a clockwise couple that rotates the axis of the slowly falling cabin in a clockwise direction, and also leads to a velocity that has a component in a forward direction, toward the landing area. Without reference to the aerodynamic force or drag on the rocopter, sub-Figure 10c indicates the result of a continued unbalance of the lift of sub-Figure 10b, wherein the craft is given an acceleration that provides a substantial component of velocity in the forward direction, toward the landing area.

This accelerated velocity toward the landing area places aerodynamic forces on both the rotor and the cabin, due to the relative motion of the wind of flight which is directed toward the rotor and cabin along or parallel to the line of the glide path. These aerodynamic forces may be considered as two forces, one centered against the center of drag of the surfaces of the rotor and of the portion of the cabin that is above the rocopter's center of gravity, the other centered against the center of drag of the portion of the cabin that is below the center of gravity. If the moments of all the aerodynamic forces about the craft's center of gravity are equal, and the lifts in all the rotational quadrants are equal to each other and in sum equal to the craft's weight, the rocopter would be moving in a steady glide along a straight line path.

Such an ideal glide, in which the resultant lift is nearly along the longitudinal or Y axis of the rocopter, is indicated in sub-Figure 10d, where the center of gravity, C.G., is rather highly placed in the cabin. The line of lift is shown as making an angle of 3° with the Y axis and as pointed aft of the Y axis. With the resultant drag at the center of gravity, as shown, the three degrees provide for an efficient wind-rotation of the rotor.

In practice, however, the aerodynamic forces and lifts nearly always depart from the above-described ideal conditions, so that the resultant drag would not be directed along the desired glide path to the center of gravity, and so that the single lifting force L of sub-Figure d would be replaced by unbalanced lifts in a pair of the quadrants. The amount and direction of the required unbalance would depend on the position and glide angle of the rocopter, as determined by means of radar or by visual sighting and by radio command.

If passengers and/or crew members are transported in the cargo cabin one of them obviously may manually control any of the automatic control devices, and thus manually steer the rocopter to the desired landing spot. Such manual control would be by means of known valve handles and/or switch control means, and could be in conjunction with radio signals from the ground.

The form of the braking and gliding rotor shown in Figure 6 has blades 73 that are shown as having their outer portions broken away and as being universally mounted on the spoke assembly 74 by means of rocking bearings about two perpendicular axes. The spoke assembly is connected to rotor hub 75 which has radial and thrust bearings on stub shaft 76, which is fixed to cargo cabin 2.

The universal joint between spoke assembly 74 and root 77 of each of the rotor blades comprises two pairs of aligned trunnions, the pairs being perpendicularly positioned around an integral ring, one pair being drivingly connected to the spoke assembly and the other pair being drivingly connected to a rotor blade. To the root 77 of each blade there is attached a yoke 78, that has a pair of legs 79 and 80. Each leg has an aperture, within which a bearing 81 is held. This bearing may be a bushing as shown or an antifriction bearing. Within these bearings there are journalled trunnions 82, which are fixed to ring 83. Ring 83 also has trunnions 84 and 85 (Fig. 8), which are journalled in bearings that are fixed to spoke elements 74A and 74B.

The joint that is described above is an outer universal joint by means of which each blade is freed for horizontal, lead-lag movement in the plane of the rotor, about trunnions 82, or for vertical movement for variation of its dihedral angle, about trunnions 84 and 85, or for a combination of these two movements. For each blade there is also provided an inner universal joint, by means of which the pitch angle of the blades may be changed, in any lead-lag position or any dihedral angle of the blade.

Said inner universal joint comprises a pair of rings 86 and 87, clamped together and about two pairs of bearings 88 and 89 by means of bolts 90, and two pairs of trunnions 91 and 92 that are journalled in said bearings. Trunnions 91 are fixed to forked extensions 93 of blade root 77; trunnions 92 are fixed to the spaced forks 94 of the outer and of the outboard pitch-changing shaft 95, which extends between a pair of spoke elements.

The inner end of shaft 95 also is attached to a universal joint. This joint, 96, which is similar to joint 86—94, universally connects outboard pitch-changing shaft 95 and inboard pitch-changing shaft 97. Each pitch-changing shaft 95 is journalled in brackets 98 and 99, and is rotated, for change of blade pitch, by means of lever 100, ball-pin linked arm 101, arm 102 that is pivoted to arm 101 and fixed to wobble ring 103.

Wobble ring 103 may be actuated up or down by means of a plurality of screwthreaded shafts 104, each of which may be turned by a reversible electric or hydraulic motor 105.

If the pitch of the blades is equal in all rotational quadrants and is to be changed the same amount in all rotational quadrants, as in the deceleration phase of the rocopter's descent, all motors 105—which may for example be four in number—are rotated for the same length of time. On the other hand, if the pitch is to be cyclically changed unequal amounts in the rotational quadrants, as in the gliding phase of the descent, the motors are operated for varying lengths of time, thus tilting wobble ring 103, and cyclically varying the pitch.

In the form of rotor shown in Figure 6 a second type of control for the brake flaps, during the deceleration phase, is indicated. This type comprises small electric motors in lieu of hydraulic motors 39—40 of Figure 5, said electric motors driving screws in the manner of motors 105, and receiving electric current via the slip rings and wires 106 and 107.

The friction on the rotor bearings will cause some rotation of the load-carrying cabin. In uses that make this rotation objectionable it may be stopped by known controllable fins pivoted on the exterior of the cabin or by any other counter-rotation means known in the aeronautical or missile art.

The rocopter comprises an appropriate type of landing gear, which will minimize damage to the blades during landing. In Fig. 2 such a landing aid is shown as comprising spike 108. If the soil, sand or artificial surface of the specific landing area is easily penetrated such a spike, which easily would enter said surface, could be efficiently used, with a nearly vertical, attitude-maintaining penetration of the surface. However, any known type of landing gear, such as spike, 108, in combination with bracing legs hinged to the base of the spike, the legs folding out in a tripod arrangement during the landing could be utilized.

*Rocopter landing control method*

The method of control of a rocopter (space craft having wind-rotatable hinged blades) that is a part of this invention is diagrammatically indicated in Fig. 1. This method comprises the following steps: (1) partially opening the rotor blades while the rocopter is traveling at supersonic speed and is outside the earth's atmosphere (and therefore is not subject to aerodynamic drag which would make necessary a large force for opening the rotor against the supersonic drag); and fully feathering the blades; (2) fully opening the rotor when the craft enters the stratosphere, and setting the blades at equal pitch angles of relatively steep pitch, for deceleration of the craft; (3) braking the blades and thus limiting their rotary speed during the deceleration phase to a safe maximum (under certain conditions, this step may be eliminated); (4) after the re-entry kinetic energy of the craft is dissipated, decreasing the pitch of the blades, and controlling their rotary speed by pitch change; (5) providing for a non-vertical gliding path of the rocopter by cyclically varying the pitch of the blades; and (6) controlling the direction and length of the gliding path by cyclically varying the blade pitch in response to radio command signals from the landing site.

Within the scope of the subjoined claims, the invention comprehends various obvious changes in the specific structure herein illustrated. For example, in the structure of Figure 4, the barometric device obviously could directly control valve 55 instead of by means of electric current.

The following invention is claimed:

1. A space vehicle comprising an after, separable rocket-motor portion, a forward, cargo-carrying portion having a fore-and-aft length that is less than half that of said after portion, and time-controlled means for separating said two portions in space whereby the after, rocket-motor portion falls away from the remainder of the vehicle and the forward, cargo-carrying portion continues on its trajectory, said cargo-carrying portion comprising: A cargo-carrying cabin having a frame; a radial and thrust bearing assembly mounted on the after portion of said frame; a rotor journalled in thrust-transmitting relationship to said frame by means of said bearing assembly, comprising a hub, a plurality of wind-rotatable airfoils, and means pivoting each airfoil to said hub whereby each airfoil may be shifted in position by variations of the aerodynamic force on it as it is rotated by the relative wind of passage thru the atmosphere, said airfoils in their folded position during the beginning of flight of the composite vehicle extending aft from the after portion of the cargo cabin along the major part of the length of the rocket-motor portion; means in said cargo-carrying portion for partially opening said blades while the vehicle is in space and before its re-entry into the atmosphere; a radio receiver; and means connected to said receiver and to said airfoils for shifting the positions of said airfoils relative to the airstream of the vehicle's descent and relative to each other; whereby the direction and angle of the vehicle's glide to a desired landing area may be controlled.

2. A space vehicle comprising an after, separable, heat-utilizing, propulsive portion, a forward load-carrying portion having a fore-and-aft length that is less than half that of said after portion, and time-controlled means for separating said two portions after said propulsive portion has propelled the composite vehicle off the earth's surface, whereby the after, propulsive portion falls away from the remainder of the vehicle and the forward, load-carrying portion continues on its trajectory, said load-carrying portion comprising: A frame for supporting a useful load; a radial and thrust bearing assembly mounted on the after portion of said frame; a rotor journalled in thrust-transmitting relationship to said frame by means of said bearing assembly, comprising a central part forming a support of said bearing assembly, a plurality of wind-rotatable, vehicle-decelerating and glide-providing blades with airfoil portions, bearing means pivoting each blade to said central part, and means for actuating said airfoil portions whereby the positions of said airfoil portions may be shifted relative to the airstream of the vehicle's descent and relative to each other, said blades extending, in their folded position during the early flight of the composite vehicle, aft from the after portion of the load-carrying frame along the major part of the length of said propulsive portion; means for partially opening said blades while the vehicle is in space and before its re-entry into the atmosphere; remote-controlled, signal-actuated means for controlling said means for actuating said airfoil portion; and means at the vehicle's landing site for transmitting a signal to said remote-controlled, signal-actuated means, whereby the airfoil portions may be shifted for control of the direction and angle of the vehicle's glide to said site.

3. A space vehicle as set forth in claim 2, in which said frame is an enclosed cabin having a landing gear on its forward portion and said rotor bearing assembly on its after portion, in which said rotor central part comprises a hub and a spoke assembly fixed to said hub, and in which said bearing means pivoting each blade comprises a hinge, one part of which is connected to said spoke assembly and the other part of which is connected to said blade.

4. A space vehicle as set forth in claim 2, which further comprises a second means for controlling said means for actuating said airfoil portions, in response to the descending vehicle's rate of deceleration in the stratosphere, for maintaining said rate at a predetermined, substantially constant level.

5. A space vehicle as set forth in claim 4, which further comprises means for braking the rotary speed of said blades and tachometer means supported by said frame for controlling said braking means.

6. A space vehicle as set forth in claim 4, which further comprises a third means for controlling said means for actuating said airfoil portions, comprising a tachometer, for limiting the rotary speed of the blades to a range that prevents disruption of the rotor parts.

7. A space vehicle as set forth in claim 4, in which said airfoil portions have a supersonic configuration.

8. A method for guidance and control of a rocopter that has variable-pitch blades, as it enters and traverses the atmosphere from space, comprising: partially opening the rocopter blades while the craft is in space and traveling at supersonic speed; fully opening the blades, as the craft enters the stratosphere, by setting the blades at equal pitch angles of relatively steep pitch, whereby the rotor decelerates the craft; equally controlling the pitch angles of the blades while the rocopter is in the stratosphere in response to changes in the rate of deceleration, thus maintaining said rate at a substantially constant and predetermined level; providing a nonvertical gliding path of the craft by cyclically varying the pitch of the blades; and controlling the direction and length of the gliding path by determining the necessary quadrants of cyclical increase and decrease of blade pitch from the direction of glide relative to an operator at the landing site; and sending a command signal from said site to the rocopter indicating the proper blade pitch in said necessary quadrants.

9. A method as set forth in claim 8, which further comprises the step of limiting the speed of rotation of the blades to a level which prevents disruption of the rotor of the rocopter.

10. A space vehicle comprising an elongated, after, generally cylindrical propulsive part having a fore-and-aft longitudinal axis, frangible bolts fixed to the forward end of said after part, and a forward, load-carrying part comprising: a cargo-carrying housing comprising the exterior surface of said vehicle, and having a fore-and-aft longitudinal axis that coincides with said first-named axis; an after cover that is fixed to said forward portion, and located above said forward portion after said bolts are severed in flight and said load-carrying part is re-entering the troposphere; a radial and thrust bearing assembly mounted on said cover; a rotor journalled in thrust-transmitting relationship to said cover and housing by means of said bearing assembly, comprising a hub, a plurality of wind-rotatable airfoils, and means pivoting each airfoil to said hub whereby it may be shifted in position by variations of the aerodynamic force on it as it is rotated by the relative wind of descent thru the atmosphere, each of said airfoils being folded aft from said hub along the major portion of the length of said propulsive part, with its after, lower tip being located above the after end of said propulsive part and thus protected from damage during launching; and means connected to said airfoils for varying their lift during descent thru the atmosphere.

11. A re-entry space vehicle capsule comprising: a cargo-carrying housing having a fore-and-aft longitudinal axis, a forward portion, and an after cover that is fixed to said forward portion and is located above said forward portion during the capsule's descent thru the atmosphere; a radial and thrust bearing assembly mounted on said cover; a rotor journalled in thrust-transmitting relationship to said cover and housing by means of said bearing assembly, comprising a hub, a plurality of wind-rotatable airfoils, and means pivoting each airfoil to said hub whereby it may be shifted in position by variations of the aerodynamic force on it as it is rotated by the relative wind of descent thru the atmosphere, each of said airfoils being longer than the length of said housing along said axis and foldable aft from said cover portion into a position that is parallel to an after extension of said axis; means supported by said housing for opening said airfoils into positions transverse to said axis; a receiver in said housing for receiving radio commands; and means connected to said receiver and to said airfoils for varying the lift of said airfoils.

12. A device as set forth in claim 11, in which said means for varying the lift of said airfoils comprises means for cyclically changing the pitch of the airfoils and for thus providing more lift in one quadrant than in the other quadrants of the rotation of the airfoils.

References Cited in the file of this patent

UNITED STATES PATENTS

| | | |
|---|---|---|
| 2,526,451 | Bensen | Oct. 17, 1950 |
| 2,654,320 | Schmid | Oct. 6, 1953 |
| 2,763,447 | Carrau | Sept. 18, 1956 |